(12) United States Patent
Gutzeit

(10) Patent No.: US 12,126,581 B2
(45) Date of Patent: Oct. 22, 2024

(54) MULTICHANNEL MESSAGING SYSTEMS AND METHODS

(71) Applicant: LeapXpert Limited, Causeway Bay (HK)

(72) Inventor: Dmitry Gutzeit, Causeway Bay (HK)

(73) Assignee: LeapXpert Limited, Causeway Bay (HK)

( * ) Notice: Subject to any disclaimer, the term of this patent is extended or adjusted under 35 U.S.C. 154(b) by 0 days.

(21) Appl. No.: 18/182,869

(22) Filed: Mar. 13, 2023

(65) Prior Publication Data

US 2023/0300094 A1     Sep. 21, 2023

Related U.S. Application Data

(60) Provisional application No. 63/321,523, filed on Mar. 18, 2022.

(51) Int. Cl.
| | |
|---|---|
| *G06F 15/16* | (2006.01) |
| *H04L 51/046* | (2022.01) |
| *H04L 51/48* | (2022.01) |
| *H04L 67/306* | (2022.01) |

(52) U.S. Cl.
CPC ............ *H04L 51/046* (2013.01); *H04L 51/48* (2022.05); *H04L 67/306* (2013.01)

(58) Field of Classification Search
CPC ...... H04L 51/046; H04L 51/48; H04L 67/306
USPC ....................................................... 709/206
See application file for complete search history.

(56) References Cited

U.S. PATENT DOCUMENTS

| | | | | |
|---|---|---|---|---|
| 11,477,144 | B1* | 10/2022 | Yasnoff | H04L 51/56 |
| 2014/0310365 | A1* | 10/2014 | Sample | G06Q 10/107 |
| | | | | 709/206 |
| 2019/0028287 | A1* | 1/2019 | Jin | G06F 16/13 |
| 2020/0014642 | A1* | 1/2020 | Sidi | H04M 3/5141 |
| 2021/0173493 | A1* | 6/2021 | Barzilay | G06F 3/0482 |
| 2022/0141263 | A1* | 5/2022 | Mauer | G06N 3/045 |
| | | | | 709/206 |
| 2022/0231975 | A1* | 7/2022 | Gutzeit | H04L 51/48 |
| 2022/0345436 | A1* | 10/2022 | Maloney | H04L 51/52 |

* cited by examiner

*Primary Examiner* — Alan S Chou
(74) *Attorney, Agent, or Firm* — Morrison & Foerster LLP

(57) ABSTRACT

Techniques for managing client profiles in a central communication platform providing communication between an organization and a plurality of clients using separate messaging applications are disclosed. An exemplary method comprises receiving a set of client information from a user of a second unit of the organization, wherein the set of client information comprises a second communication channel identifier; generating, based on the set of client information, a second client profile; comparing the second communication channel identifier with one or more existing communication channel identifiers of the communication platform; based on the comparison, either associating the second client profile to an existing client, or generating a new instance of a predefined data structure corresponding to a new client and associating the second client profile with the new instance of the predefined data structure corresponding to the new client.

20 Claims, 11 Drawing Sheets

FIG. 7C

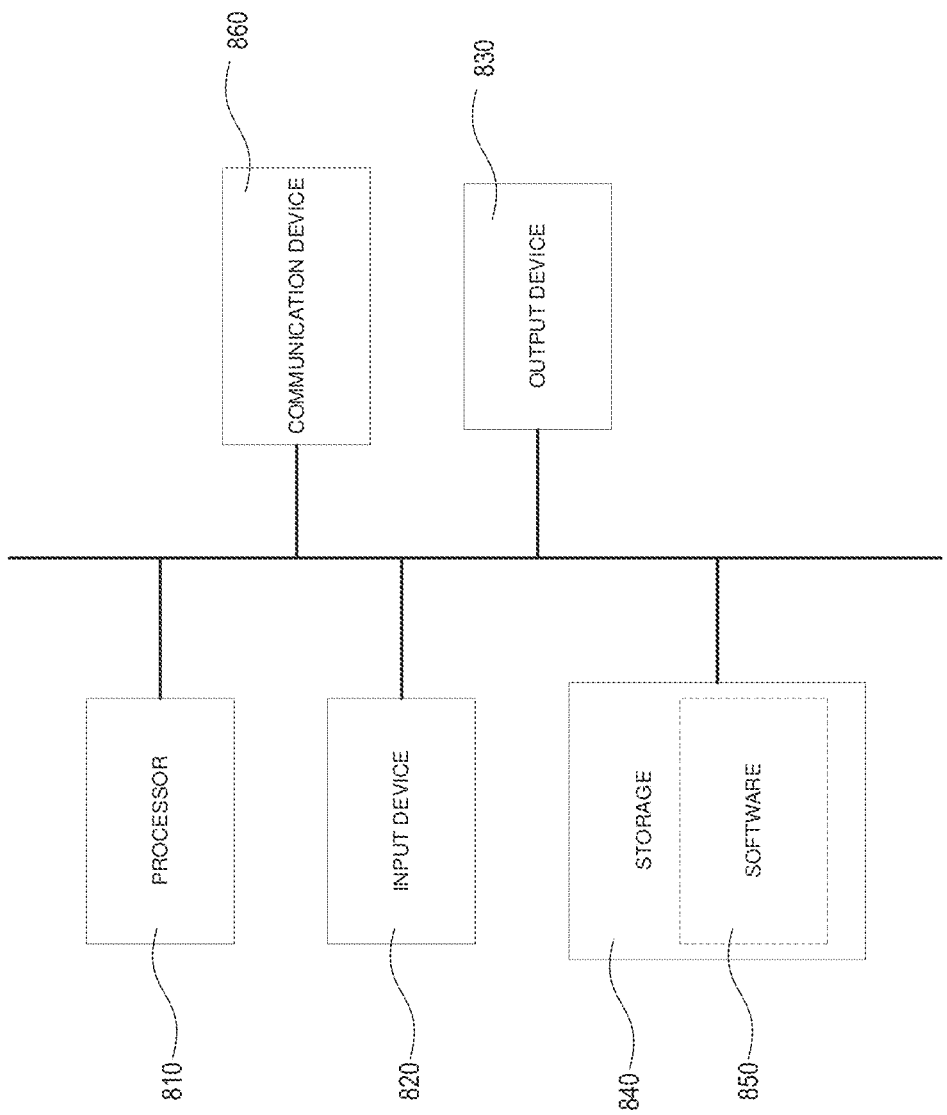

MULTICHANNEL MESSAGING SYSTEMS AND METHODS

CROSS REFERENCE TO RELATED APPLICATIONS

This application claims benefit of U.S. Provisional Application No. 63/321,523, filed Mar. 18, 2022, the entire contents of which is incorporated herein by reference.

FIELD OF INVENTION

The present disclosure relates generally to a communication platform, and more specifically to techniques for facilitating communication via multiple messaging applications using a communication platform.

BACKGROUND

Due to different privacy regulations, information about clients of an organization (e.g., a financial institution) cannot be shared between different business units within the organization. For example, a financial institution may comprise business units operating in completely different banking verticals, with potential conflict of interest between them. Accordingly, an information barrier protocol within an organization, such as "ethical walls" or "Chinese walls," may need to be established to prevent exchange of information or communication that could lead to conflicts of interest.

An external client may work with multiple business units of an organization (e.g., a bank) independently. As discussed above, while such a client is a single client to the organization, the client's information cannot be shared across business units. Accordingly, client information may be duplicated across different business units and relevant information systems. Furthermore, one business unit is not allowed to know that a client is a client of another business unit.

The situation becomes problematic when the organization, including its multiple business units, adopts a single communication platform to communicate with its clients. What complicates things even more is that a single client may use multiple communication channels (i.e., multiple messaging platforms, applications, or networks), such as the WhatsApp messaging application, the WeChat messaging application, the Signal messaging application, the Telegram messaging application, and many others. A first business unit may only know that the client uses WhatsApp and WeChat, while a second business unit may only know that the client individual uses Signal and Telegram. But from the perspective of the central messaging platform and the organization, for various purposes (e.g., auditing), the client should remain a single entity that has different means of communication, whether it is email, phone numbers, or other communication channels, and even if the client is communicating with multiple different business units.

BRIEF SUMMARY

To prevent PII sharing and leakage between business units, embodiments of the present disclosure may generate multiple client profiles facing different business units within an organization, while behind the scenes such profiles may be unified by the same client entity with the same communication channels identifiers to allow for easy management and retrieval of communications (e.g., for auditing purposes).

Using embodiments of the present disclosure, different business units within the same organization may each onboard their own clients without unnecessarily convoluting the system. For a single client, the central messaging platform may support separate client profiles for the different business units but associate the client profiles with a single client entity, instead of having multiple client entities. As a result, the central messaging platform may make it more easy and efficient to retrieve a holistic view of all communications between the organization and a client entity. Because the system only maintains a single client entity which may be associated with multiple profiles, all of the communication associated with a particular client entity may be easily retrieved based on the client profiles associated with the particular client entity. The system may also help clearly indicate to a requestor (e.g., an auditor) the organization's involvement with a client (e.g., which business units are working with the client) and provide user interfaces for retrieving and viewing all of the communications associated with the client across different business units. Without leveraging the techniques described herein, there may be multiple, unrelated client entities created for the same client. When all of the communications between the organization and that client entity are requested, it would be difficult for the system to compile the communications. An auditor may have to manually survey the various business units separately in the organization to obtain a holistic view of the organization's involvement with the client. This may a lengthy and cumbersome process that increases the chance of error, resulting in some communications not being retrieved. Thus, embodiments of the present disclosure provide improved user interfaces, improves data management and retrieval for the communication platform, and reduces unnecessary usage of memory and processing power of the computer system.

An exemplary method for managing client profiles in a central communication platform providing communication between an organization and a plurality of clients using separate messaging applications, wherein the central communication platform comprises a database storing one or more existing communication channel identifiers, wherein the one or more existing communication channel identifiers comprise a first communication channel identifier associated with a first client profile associated with an existing client, and wherein the first client profile is used by a first unit of the organization to communicate with the existing client using the first communication channel identifier; comprises: receiving a set of client information from a user of a second unit of the organization, wherein the set of client information comprises a second communication channel identifier; generating, based on the set of client information, a second client profile in the database to be used by the user of the second unit of the organization; comparing the second communication channel identifier with one or more existing communication channel identifiers of the communication platform; if the second communication channel identifier matches the first communication channel identifier: associating the second client profile to the existing client; if the second communication channel identifier does not match any of the one or more existing communication channel identifiers: generating a new instance of a predefined data structure corresponding to a new client; and associating the second client profile with the new instance of the predefined data structure corresponding to the new client.

In some embodiments, the method further comprises: associating one or more communications in the communication platform between the user of the second business unit and the second communication channel identifier with the second client profile.

In some embodiments, the method further comprises: associating one or more communications in the communication platform between a user of the first business unit and the first communication channel identifier with the first client profile.

In some embodiments, the method further comprises: displaying a first user interface indicating that the existing client is associated with the first client profile and the second client profile.

In some embodiments, the method further comprises: displaying a second user interface with additional information associated with the existing client.

In some embodiments, the method further comprises: displaying a third user interface for updating the additional information associated with the existing client.

In some embodiments, the method further comprises: displaying a fourth user interface comprising one or more communications associated with the first client profile and one or more communications associated with the second client profile.

In some embodiments, the one or more existing communication channel identifiers comprises an identifier indicative of a third-party communication platform and a user name.

In some embodiments, the one or more existing communication channel identifiers comprises an identifier indicative of a third-party communication platform and a phone number.

In some embodiments, the method further comprises: receiving, from the user, a second set of client information comprising a third communication channel identifier and a fourth communication channel identifier; generating a third client profile based on the second set of client information; comparing the third and fourth communication channel identifiers with the one or more existing communication channel identifiers; and if the third communication channel identifier matches the first communication identifier, associating the third client profile with the existing client.

In some embodiments, the method further comprises: if the fourth communication channel identifier does not match any of the one or more existing communication channel identifiers: generating a second new instance of a predefined data structure corresponding to a second new client, and associating the third client profile with the second new client.

In some embodiments, the method further comprises: associating one or more communications in the communication platform between the third communication channel identifier and the user with the third client profile and the third communication channel identifier.

In some embodiments, the method further comprises: associating one or more communications in the communication platform between the fourth communication channel identifier and the user with the third client profile and the fourth communication channel identifier.

In some embodiments, the new instance of the predefined data structure comprises a first name, a last name, a language, a company name, a country, an email, the first communication channel identifier, or any combination thereof.

In some embodiments, the method further comprises: sending an invitation request to begin messaging with the user of the second unit.

In some embodiments, the method further comprises: upon acceptance of the invitation, establishing a connection between the central communication platform and the third-party communication platform associated with the second communication channel identifier.

An electronic device for managing client profiles in a central communication platform providing communication between an organization and a plurality of clients using separate messaging applications, wherein the central communication platform comprises a database storing one or more existing communication channel identifiers, wherein the one or more existing communication channel identifiers comprise a first communication channel identifier associated with a first client profile associated with an existing client, and wherein the first client profile is used by a first unit of the organization to communicate with the existing client using the first communication channel identifier; comprises: one or more processors; a memory; and one or more programs, wherein the one or more programs are stored in the memory and configured to be executed by the one or more processors, the one or more programs including instructions for: receiving a set of client information from a user of a second unit of the organization, wherein the set of client information comprises a second communication channel identifier; generating, based on the set of client information, a second client profile in the database to be used by the user of the second unit of the organization; comparing the second communication channel identifier with one or more existing communication channel identifiers of the communication platform; if the second communication channel identifier matches the first communication channel identifier: associating the second client profile to the existing client; if the second communication channel identifier does not match any of the one or more existing communication channel identifiers: generating a new instance of a predefined data structure corresponding to a new client; and associating the second client profile with the new instance of the predefined data structure corresponding to the new client.

An exemplary non-transitory computer-readable storage medium stores one or more programs for managing client profiles in a central communication platform providing communication between an organization and a plurality of clients using separate messaging applications, wherein the central communication platform comprises a database storing one or more existing communication channel identifiers, wherein the one or more existing communication channel identifiers comprise a first communication channel identifier associated with a first client profile associated with an existing client, wherein the first client profile is used by a first unit of the organization to communicate with the existing client using the first communication channel identifier; and wherein the one or more programs comprising instructions, which when executed by one or more processors of an electronic device having a display, cause the electronic device to: receive a set of client information from a user of a second unit of the organization, wherein the set of client information comprises a second communication channel identifier; generate, based on the set of client information, a second client profile in the database to be used by the user of the second unit of the organization; compare the second communication channel identifier with one or more existing communication channel identifiers of the communication platform; if the second communication channel identifier matches the first communication channel identifier: associate the second client profile to the existing client; if the second communication channel identifier does not match any of the one or more existing communication channel identifiers: generate a new instance of a predefined data structure corresponding to a new client; and associate the second client profile with the new instance of the predefined data structure corresponding to the new client.

DESCRIPTION OF THE FIGURES

FIG. 7C depicts an exemplary user interface for updating the information of a specific client profile, in accordance with some embodiments.

FIG. 8 depicts an exemplary electronic device in accordance with some embodiments.

DETAILED DESCRIPTION

Figure 1:
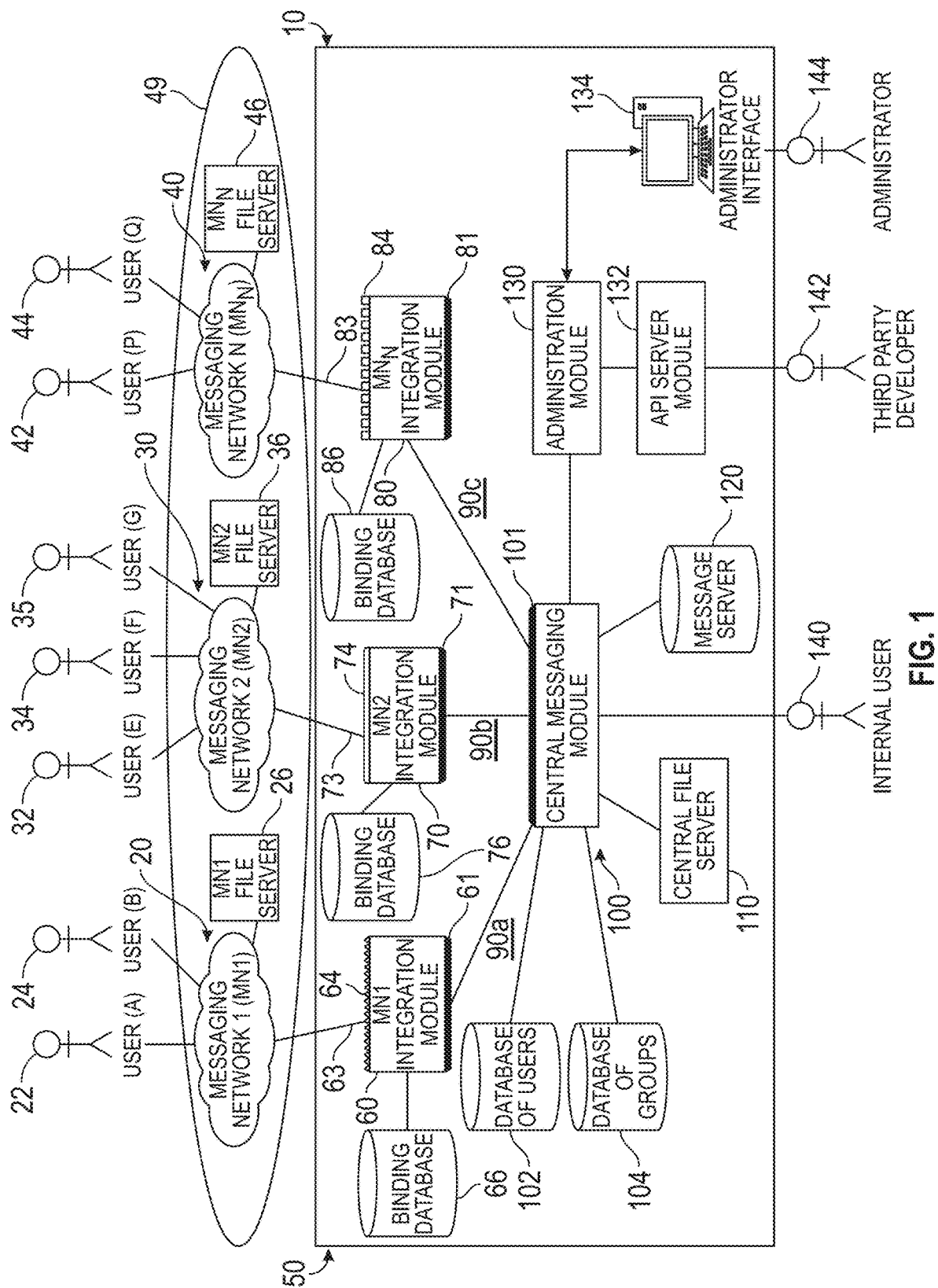
FIG. 1 depicts the schematic architecture of an embodiment of the system, in accordance with some embodiments.

To prevent PII sharing and leakage between business units, embodiments of the present disclosure may generate multiple client profiles facing different business units within an organization, while behind the scenes such profiles may be unified by the same client entity with the same communication channels identifiers to allow for easy management and retrieval of communications (e.g., for auditing purposes).

Using embodiments of the present disclosure, different business units within the same organization may each onboard their own clients without unnecessarily convoluting the system. For a single client, the central messaging platform may support separate client profiles for the different business units but associate the client profiles with a single client entity, instead of having multiple client entities. As a result, the central messaging platform may make it more easy and efficient to retrieve a holistic view of all communications between the organization and a client entity. Because the system only maintains a single client entity which may be associated with multiple profiles, all of the communication associated with a particular client entity may be easily retrieved based on the client profiles associated with the particular client entity. The system may also help clearly indicate to a requestor (e.g., an auditor) the organization's involvement with a client (e.g., which business units are working with the client) and provide user interfaces for retrieving and viewing all of the communications associated with the client across different business units. Without leveraging the techniques described herein, there may be multiple, unrelated client entities created for the same client. When all of the communications between the organization and that client entity are requested, it would be difficult for the system to compile the communications. An auditor may have to manually survey the various business units separately in the organization to obtain a holistic view of the organization's involvement with the client. This may a lengthy and cumbersome process that increases the chance of error, resulting in some communications not being retrieved. Thus, embodiments of the present disclosure provide improved user interfaces, improves data management and retrieval for the communication platform, and reduces unnecessary usage of memory and processing power of the computer system.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Referring to FIG. 1, there is depicted an exemplary communication system according to an embodiment of the present disclosure. User A 22 and user B 24 have accounts on a first messaging network 20. Associated with the first messaging network is a file server 26 on which files accessible to users of that network are stored. It would be appreciated that the same messaging client may be used by users A and B but may be operable on various types of terminal devices, including portable electronic devices or laptops or desktop computers. These devices would provide software applications which enable users to log in to their specific accounts on that messaging network and communicate messages to, from and between other users on the same messaging network as is known in the art. For the embodiment depicted; this messaging network 20 could be WhatsApp; although it would be appreciated that this is an arbitrary designation.

Referring to the second messaging network 30, user E 32, user F 34 and user G 35 each have unique messaging accounts on this messaging network which are accessible via applications operating on terminal devices such as portable electronic devices, laptops or desktop computer systems. Similarly, as with the first messaging network 20, a messaging file server 36 is associated with the second messaging network, providing the facility to store messages and files associated with or embedded with messages transmitted by, to and between users of messaging network 2. For the embodiment depicted; this messaging network could be WeChat; although it would be appreciated that this again merely an arbitrary designation.

Finally, user P 42, user Q 44 operate on messaging network 40 similarly operate their user accounts on messaging applications accessible on terminal devices which may include portable electronic devices, laptops or desktops. As with the first and second messaging networks, messaging network 40 has an associated messaging network file server 46 by which files transmitted to and between members of that network may be stored.

It would be appreciated that the present disclosure provides a means and system by which messages from each of the first 20 messaging network, second messaging network 30 and N$^{th}$ messaging networks 40 may be communicated to internal users 140 of the messaging platform through the operation of the communication system 10 of the present disclosure. Client applications for one communication channel or messaging network may be operable on various electronic devices (e.g. WhatsApp on a smartphone, tablet and laptop computer) in existing systems.

The messages transmitted from the internal user 140 to the various users (22, 24, 32, 34, 35, 42, 44) of the messaging platforms as well as the messages received from the users of the various messaging platforms may include pre-pended or appended user account details which are automatically sent and stripped and/or processed by the respective messaging networks prior to dissemination on the central messaging platform.

The multi-channel communication method and system of the present disclosure is facilitated by the central messaging platform 50 which includes a first integration module 60 for integration between the first messaging network 20 and the central messaging module 100. Similarly, a second network integration module 70 provides an interface between the second messaging network 30 and the central messaging module 100. Finally, an N$^{th}$ integration module 80 is depicted for providing integration between the central messaging module 100 and the N$^{th}$ messaging network 40.

Additionally, and including an exemplary schema as depicted below in Table 1, binding databases 66 for the first messaging network, 76 for the second messaging network, and 86 for the N$^{th}$ messaging network are associated with the various integration modules. These binding databases store an association between the messaging network account identifier of the various user accounts on the various user messaging network with a user ID on the central messaging platform which is created as discussed in more detail below.

TABLE 1

| | Binding Databases |
|---|---|
| Central User ID | Messaging Network 1 Account Number (e.g. WhatsApp) |
| CM001 | +86 12346453 |
| CM003 | +852 123456 |
| ... | ... |

It would be appreciated that the term "database" refers to the function performed by the respective binding databases 66, 76 and 86 rather than the physical manifestation thereof. As such, the "database" may refer to a logical database defining the logical structure and relationship between the above associations and may be stored across various pieces of hardware including one or more service. Alternatively, the term "database" may also refer to storage of database in an unstructured form, in one or more physical pieces of hardware such as one or more service. It would be appreciated that the various integration modules 60, 70, 80 include a database management system for facilitating the corresponding database analyzing and obtaining results obtained. This database management system may be part of the integration module or may be executed on dedicated hardware without departing from the scope of the present disclosure.

Each of the respective integration module 60, 70, 80 have interfaces 64, 74, 84 which translate commands to/from the central messaging platform and the messaging network with which they are in communication. It would be appreciated that these interfaces may be communicatively coupled to the messaging network across links 63, 73, 83 via standard wired or wireless network communications. It would be appreciated that these interfaces 64, 74, 84 are implementations of the API exposed by the messaging networks for the specific networks. For example, the interface 64 could be configured to provide commands and appropriate variables to the WhatsApp API or SDKs; whereas interface 74 issues commands and variables in a format compliant with the WeChat API etc.

Similarly, the various integration modules 60, 70, 80 have corresponding interfaces 61, 71, 81 for interacting with an interface 101 of the central messaging module 100. It would be appreciated that the content of these interfaces is consistent across each of the various integration modules as represented by the common interfaces 61, 71, 81.

These interfaces to the integration modules are configured for sending and receiving messages to and from the central messaging module 100 via communication links 90*a*, 90*b* and 90*c* which may be wired or wireless communication links without departing from the scope of the present disclosure.

Messages may be passed through interface 101 of the central messaging module 100 and are the means by which standard messaging commands and contents are transmitted from the central messaging module 100 to the corresponding integration module. Also, in communication with the central messaging module 100 is a database of users 102 and a database of groups 104.

As with the binding databases 66, 76 and 86, the database of users and of groups refer to the association rather than the physical manifestation thereof. As such, the "database" may refer to a logical database defining the logical structure and relationship between the above associations and may be stored across various pieces of hardware including one or more service. Alternatively, the term "database" may also refer to storage of database in an unstructured form, in one or more physical pieces of hardware such as one or more service. It would be appreciated that the various database of users 102 and of groups 104 include a database management system for facilitating access to the corresponding database and analyzing results obtained. This database management system may be part of the integration module or may be executed on dedicated hardware without departing from the scope of the present disclosure.

It would be appreciated that the database of users contains an association between the user ID allocated upon establishment of that user ID in the central messaging platform and an indication as to what messaging platform this user account is associated with. For example, in the embodiment depicted, it would be appreciated that user ID CM001, CM003 are associated with Messaging Network 1 (and being ultimately resolvable by the binding database of Messaging Network 1 to user accounts A and B respectively as noted above in Table 1).

TABLE 2

Central Database of Users

| Central User ID | Association with Messaging Network |
|---|---|
| CM001 | MN1 |
| CM002 | MN2 |
| CM003 | MN1 |
| CM004 | MN2 |
| CM005 | $MN_x$ |
| CM006 | $MN_y$ |

The above association between the user accounts and the respective messaging networks utilized could be stored in the user database 102.

In the database of groups, each of the respective users may be associated with a plurality of groups, for example, as shown in the following Table 3a, user CM001 may be associated with Group 1 and Group 2 represented by $G_1$ and $G_2$. (This user would ultimately be resolvable to User A of Messaging Network 1 by the binding database associated with Messaging Network 1).

User CM003 may be associated with $G_1$. User CM002 may be associated with $G_2$, $G_5$. User CM004 may be associated with G1, G2 and G3. User CM005 associated with G3, G4 and G5 and user CM006 associated with G3, G4. User CM007 associated with G5 and G1. It would be appreciated that these associations are essentially arbitrary and many other combinations would be possible without departing from the scope of the present disclosure. (Similar resolving of the central user account identification codes to accounts on the various messaging networks could also readily be appreciated).

The corresponding table sorted by users is shown below for each of the respective groups; as Table 3a, with group IDs in Table 3b. It would also be appreciated that this group membership could be dynamically changed and administered by the central messaging module 100. It would also be appreciated that the group IDs may be any identifying information, such as position titles, project or team names, company names, etc.

TABLE 3a

| Central User ID | Group Membership |
|---|---|
| CM001 | $G_2$ |
| CM002 | $G_1$ $G_2$ $G_5$ |
| CM003 | $G_2$ $G_5$ |
| CM004 | $G_1$ $G_3$ |
| CM005 | $G_3$ $G_4$ $G_5$ |
| CM006 | $G_3$ $G_5$ |
| CM007 | $G_5$ |

TABLE 3b

GROUP ID

Group 1 - XYZ Analyst
Group 2 - ABC Analyst
Group 3- Materials Analysts
Group 4- Finance Analysts TABLE 3b-continued

GROUP ID

Group 5- Project Zebra
Group 6- Project Alpha

Also in communication with the central messaging module 100 is a central file server 110. It would be appreciated that this central file server 110 may store the associated files transmitted during the conversations between the users (22, 24, 32, 34, 35, 42, 44) and internal users 140 facilitated by the messaging platform of the present disclosure.

The central messaging module 100 may also be communicatively coupled with a message server 120 on which the messages between the users (22, 24, 32, 34, 35, 42, 44) and internal users 140 on the platform may be stored as is discussed in more detail below. Finally, the central messaging module 100 may be communicatively coupled with an administration module 130 which in turn is coupled to an application programming interface server module 132 by which third party developers 142 may interact with those central messaging module 100. Similarly, the administration module 130 is in communication with an administration interface 134 by which an administrator 144 may look after administrative functions of the central messaging platform.

These administrative functions may include but are not limited to creation, addition, modification of user profiles on the central messaging module 100; management of the association of users for the integration modules to handle communication with messaging networks and management and administration of groups and administration of groups. The central messaging platform 50 may be used by an internal user 140 through an application using standard hardware such as a keyboard mouse, touchscreen etc.

Figure 2B:
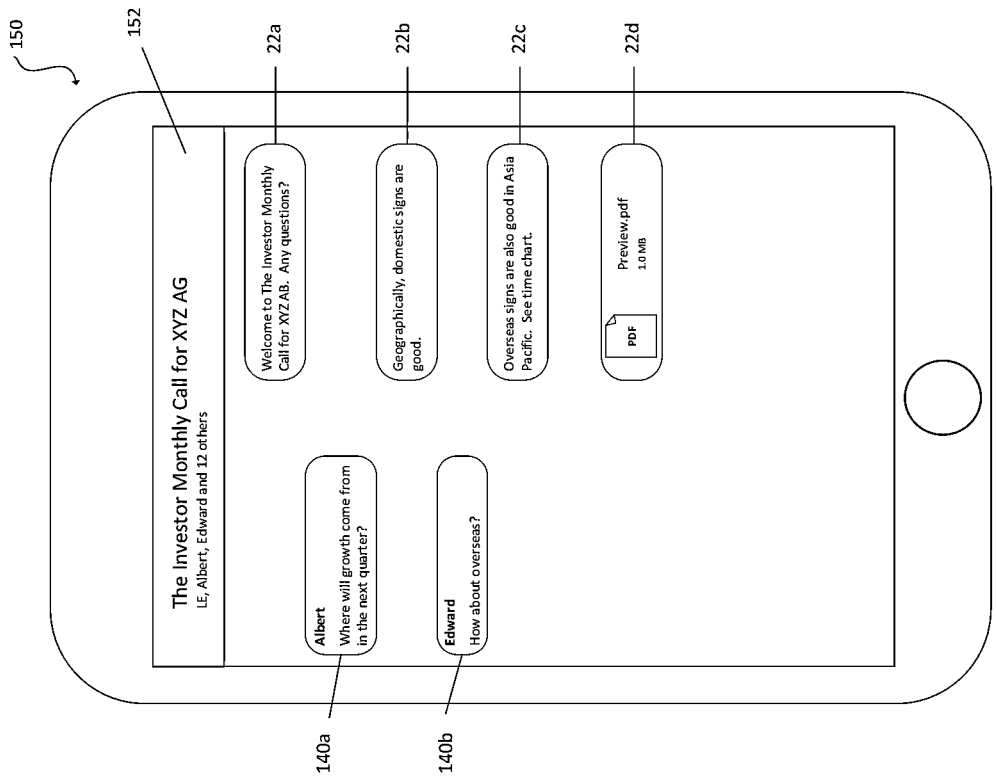
FIG. 2B depicts an exemplary representation of a simplified chat or conversation as it would appear to a user communicating with an internal user of the communication platform through an external channel, in accordance with some embodiments.
Figure 2A:
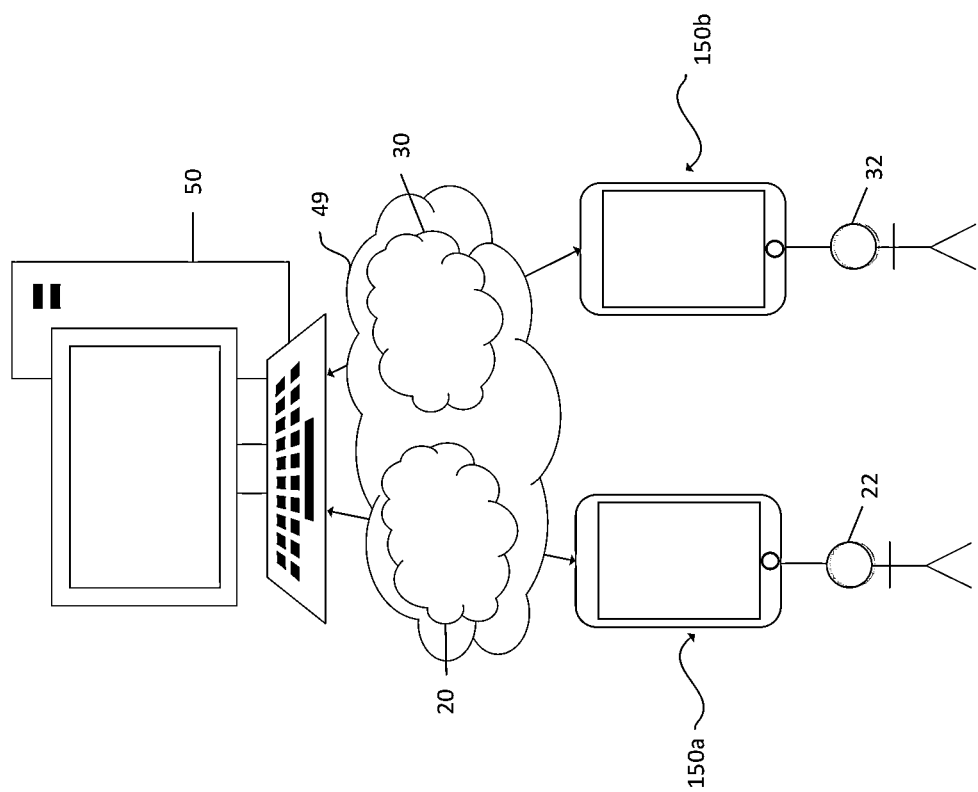
FIG. 2A depicts an exemplary representation of a simplified schematic architecture of the present disclosure as it would appear to users interacting with the present disclosure through an external channel, in accordance with some embodiments.

Referring to FIG. 2A, there is depicted an exemplary representation of a simplified schematic architecture of the present disclosure as it would appear to a user (22, 24, 32, 34, 35, 42, 44 in FIG. 1). As depicted, user A 22 operates a portable electronic device 150a on which is stored a messaging application on which they have established an account, to operate a messaging network 20. This messaging application communicates across a communications network 49 with a messaging platform/server (not shown) which administers communications with, to and between participants having accounts on messaging network 20.

Similarly, user E 32 has a portable electronic device 150b upon which a further messaging application (different to the messaging application of the first user) and which their user account is established. For the purposes of the example this user account is on a different messaging network 20 on which the account of user A 22 is operable.

Both messaging network/communication channel of user A 22 and the messaging network/communication channel of user B 30 are in communication with the central messaging platform 50 of the present disclosure. As is discussed in more detail, this arrangement enables user A 22 executing on the application on the portable electronic device 150a and user B 32 executing on the portable electronic device 150b on the application and stored via the respective networks to communicate with internal users 140 through the central messaging module 100 of the present disclosure.

Similarly, referring to FIG. 2B, there is depicted an exemplary view of what user A 22 may see when using their messaging application or communication channel or messaging platform of choice which is supported by the system of the present disclosure. At 152, the specific name of the conversation may be specified. The conversation may be established or initiated by administrator 144 of the central messaging module who may also be responsible for associating users with specific groups as previously discussed, as well as establishing unique user IDs for each of the users of the various platforms for that user on the central messaging platform. The conversation may also be established or initiated by a user (22, 24, 32, 34, 35, 42, 44) or by an internal user 140.

As depicted, the initial message in the time sequence of the conversation is transmitted by user A 22, this message being labelled 22*a*. In this case, message 140*a* in response is transmitted from Albert, a first internal user of the central messaging platform of the present disclosure. Albert's first question in response to message 22*a* is communicated to all members in the conversation. That is, Albert's message 140*a* is communicated both to the second internal user Edward and to user A 22, who may be using their messaging application or communication channel or messaging platform of choice.

As shown, user A 22 responds with a message 22*b*, to Albert's question. Similarly, this message is disseminated across all users, including both internal users Albert and Edward.

Edward then poses a question 140*b* in the group chat, with this message again disseminated to all users. User A 22 responds to Edward's question in message 140*b* with a message 22*c* and attaching a file 22*d*.

It would be appreciated that as shown, messages from Albert, Edward and user A 22 are communicated across messaging platforms to each of the respective users in the time sequence depicted.

These messages may be stored on the message server of the central messaging platform messaging server 120 with the attached file 22*d* stored on the central file server 110. Albert and Edward may access the file 22*d* directly from the group chat, or may need to close the group chat and retrieve the file directly from the file server 110.

Optionally, the file(s) 22*d* may be disseminated by uploading the file(s) 22*d* to servers of the messaging network used by user A 22, and then sending a message to inform the users (Albert and Edward) of the location of the file(s) 22*d* on the servers of the messaging network used by user A.

Alternatively, the file(s) 22*d* may be uploaded to an file server on the central messaging platform, and a link to this location on the central messaging platform may be disseminated to users (Albert and Edward), such that they can navigate to this location and obtain the file.

The central messaging platform aims to address challenges that may arise when managing communications between multiple business units of an organization and the same client when the business units are walled off from each other. In some environments, a single system may control client information, and all of the business units may be allowed access to the same client information, given appropriate permissions. However, in other environments, this may not be allowed (e.g., due to privacy regulations), so different business units within a single organization are forbidden to share client information with each other. Each business unit may only know a set of client information that was provided directly to the business unit, even though another business unit may also be working with the same client and may know some additional or different information about the client. This may occur, for example, if the different business units operate in completely different banking verticals, with potential conflicts of interest between them. In order to satisfy privacy requirements in such situations, virtual "walls", such as ethical walls, may be established to prevent any information sharing between the different business units. However, such cases may lead to duplication of client information across different business units, departments, and information systems.

The situation becomes problematic as multiple business units may adopt a single platform that is used for all communications with the client, despite the business units being completely separated from each other by the ethical walls. What complicates things even more is that a client may use multiple communication channels, such as WhatsApp, WeChat, Signal, Telegram, and many others. The communication channels described herein may refer to various messaging platforms, applications, or networks, for example: WhatsApp messaging application, the WeChat messaging application, the Signal messaging application, the Telegram messaging application. A first business unit may only know that the client uses WhatsApp and WeChat, while a second business unit may only know that the client uses Signal and Telegram. In such cases, from the perspective of the central messaging platform, the client should remain a single entity that has different means of communication, whether it is email, phone numbers, or other communication channels. For various purposes (e.g., auditing), the client should remain a single entity to the platform, even if the client is communicating with multiple different business units separated by ethical walls.

Figure 3:
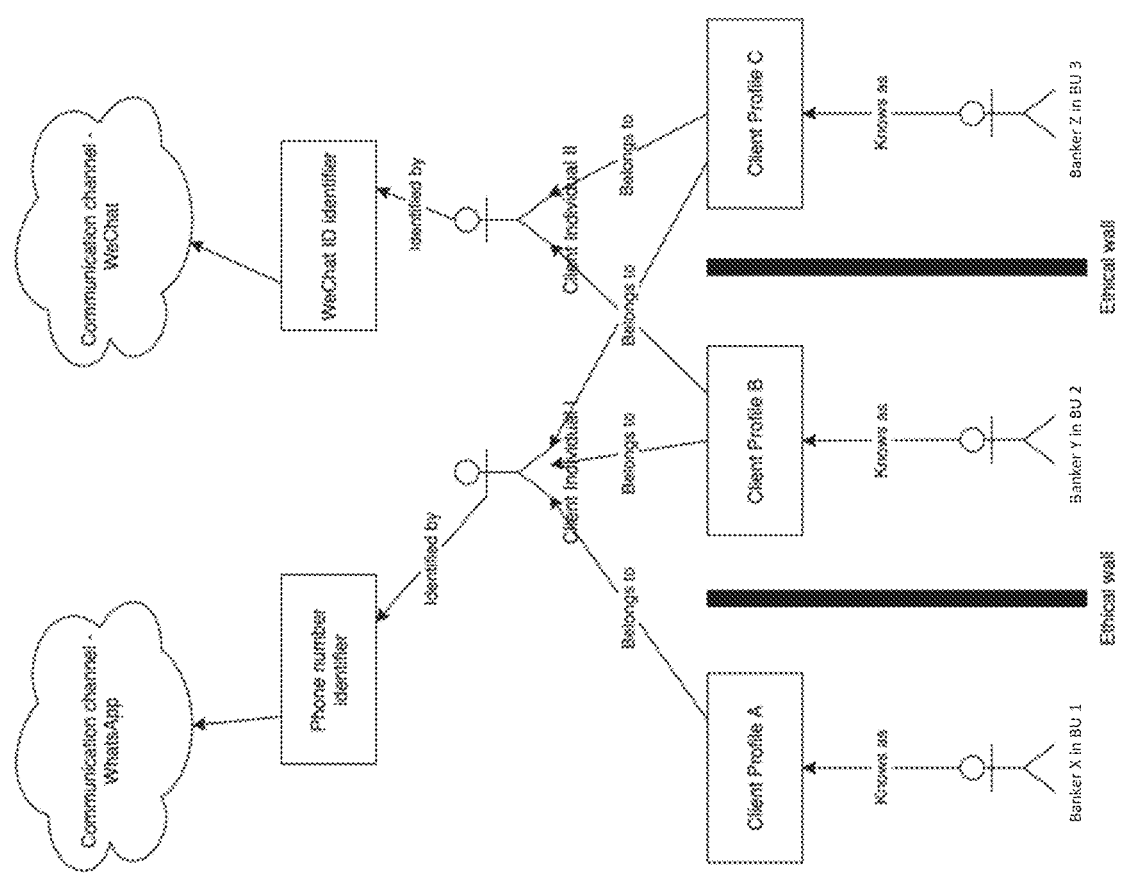
FIG. 3 depicts an exemplary schematic architecture of how a central messaging platform facilitates communication between clients and various business units within the same organization, in accordance with some embodiments.

FIG. 3 illustrates an example of the aforementioned challenge, in accordance with some embodiments. In this example, three business units (BU) 1, 2, and 3 may all be part of a single organization, such as a bank. Each of the business units may comprise a number of members, such as bankers. Despite being part of the same organization, the three business units are separated from one another by ethical walls. As a result, no information may be shared between any of the three business units.

The three business units may use a single system, the central messaging platform of the present disclosure, when communicating with clients. The three business units may also be communicating with the same client, such as Client Individual I. Because of the ethical walls, each of the three business units may all need to be able to communicate with Client Individual I without knowing that the other two business units are also doing the same. In some environments, this exemplary situation may be enforced by providing each of business units 1, 2, and 3 with their own separate copy of information for Client Individual I. However, this may lead to the same information being duplicated multiple times, and thus a single client individual may now appear as multiple client individuals in the system, despite being the same client individual. Further, it is difficult for the central messaging platform to easily identify, manage, and present communications between Client Individual I and the organization (e.g., for auditing purposes), because the communications are associated with different business units that are walled off from each other.

To remedy this problem, the central messaging platform provides each business unit with a client profile. Each client profile is only accessible by, is associated with, or belongs to, a single business unit, and is not connected to the client profiles that belong to the other business units. The client profile provides the associated business unit with the information on a client that said business unit is permitted to access. Behind the scenes, obfuscated from the business units, the client profile is associated with a client entity, such as Client Individual I, that the client profile is representing to the business unit. As a result, each business unit retains the same level of information access to the client they are communicating with, while at the same time, a client entity remains a single client entity in the system and is not duplicated as a result of multiple business units all having them as a client. Further, it is easy for the central messaging platform to identify, manage, and present communications between Client Individual I and the organization because all of these communications are associated with the same client entity.

FIG. 3 further depicts an exemplary schematic architecture of how the central messaging platform facilitates communication between clients (Client Individual I and Client Individual II) and members of an organization (bankers X, Y, and Z). In the depicted example, Client Individual I is identified by a WhatsApp account associated with a phone number, and Client Individual II is identified by a WeChat account associated with a WeChat ID. It may be noted that the communication channel may be any third-party communication platform with any appropriate identifier, whether it be a phone number, a platform specific identifier, a user name, or any appropriate equivalent. Further, the organization is a bank having three business units ("BU"). Banker X belongs to business unit ("BU") 1, Banker Y belongs to business unit ("BU") 2, and Banker Z belongs to business unit ("BU") 3. BU 1 is only in communication with Client Individual I, while BU 2 and 3 are each in communication with both Client Individual I and II. The client individuals may be individual contacts who may be from the same firm, or may be completely separate entities with no relation to each other. A client individual associated with and identified by the communication channels may be an individual from the client organization, a group of individuals from the client organization, a system used or owned by the client organization, etc. While the example in FIG. 3 depicts an exemplary banking organization having different business units, it should be understood that the techniques described herein can be used in any organization (e.g., a law firm having different practice groups).

BU 1, BU2, and BU3 are separated by ethical walls. Thus, banker X in BU 1 may not be allowed to know that banker Y in BU 2 and banker Z in BU 3 are also in communication with Client Individual I through the same communication channels. The banker X is also not able to access any information about the client that was not already available to BU 1 in the client profile (i.e., Client Profile A) associated with that business unit. The information about the client that is available to each business unit is stored in the client profile associated with the business unit. In this case, BU 1 only has access to information about the client that is available in Client Profile A, BU 2 only has access to client information that is available in Client Profile B, and BU 3 only has access to client information that is available in Client Profile C. Each of the client profiles may contain different sets of information related to the client, although they may also contain the same or overlapping sets of information. Each of the three bankers, by being a part of their respective business units, also only have access to the client profile associated with the BU they are a part of.

Each of the three business units may communicate with Client Individual I as part of their daily work. The description herein may be with respect to Client Individual I, although it may be noted the same or similar mechanism may apply to Client Individual II. The bankers may add the client individual prior to beginning to communicate with them. When onboarding new client individuals, bankers in a business unit may create a client profile for the client individual in the system of the central messaging platform. The client profile may comprise a variety of information, such as the first and last name of the client individual, a language to communicate in, a name for an organization that the client individual may belong to (such as a company name), a country where the client individual or their organization is located, an email, the one or more communication channels and/or communication channel identifiers that may be used to communicate with the client individual, among many others. In the example, Client Individual I has indicated WhatsApp as their preferred communication channel. The WhatsApp account may be identified using a phone number identifier. When each business unit on-boards the client individual, each of the different business units may create a client profile that comprises the communication channel identifiers as well as some or all of the aforementioned information for their respective business unit without knowing that the same client individual is already in contact with or is concurrently being on-boarded by the other business units. The client profiles may be completely separate from each other, even though they may store largely similar information on the same client. Each of the client profiles may not even be aware of the other client profiles.

In the example, each of bankers X, Y, and Z in business units 1, 2, and 3 may communicate with Client Individual I using the WhatsApp account associated with the phone number identifier. Banker X, though it may be noted the same may apply to banker Y and C, may communicate with the client individual by sending messages directly using the central messaging platform of the present disclosure. The central messaging platform may deliver any message from banker X directly to the WhatsApp account identified by the phone number identifier. When the message from banker X is sent by the central messaging platform, the platform may indicate either that the message was sent by banker X, or by the business unit they belong to, BU 1. This metadata may be delivered along with the message to the WhatsApp account. Once the message has been delivered to the WhatsApp account, the client individual may view the message directly from the WhatsApp account.

After reading the message, Client Individual I may send a reply directly through the WhatsApp account. The central messaging platform may receive the reply directly from WhatsApp, before displaying the reply for banker X. The messaging platform may further display the full message history between banker X and the client. If multiple bankers from BU 1 are communicating with the client through the WhatsApp communication channel, the central messaging platform may support group chats where any of the bankers may send messages to the group. The central messaging platform may then send that message directly to the WhatsApp account identified by the phone number identifier, along with any necessary metadata, such as who sent the message, the time it was sent, and/or the group chat it belongs to (if any). In the case where there is a group chat involving multiple bankers, the client individual may see the example as shown in FIG. 2B with messages from different bankers. It may be noted that in such cases involving group chats, Albert and Edward who sent messages 140a and 140b cannot be bankers from different business units even if they are all able to communicate with the client through the same communication channel, as that would violate the ethical wall that exists between the business units.

In the example in FIG. 3, Client Profile A only has a connection to Client Individual I, so BU 1 is only aware of and only has access to the WhatsApp communication channel, and is not aware of and does not have access to the WeChat communication channel. This means that BU 1, and any banker in BU 1 who also uses Client Profile A, is only able to communicate with Client Individual I using the WhatsApp communication channel, but is not able to communicate with Client Individual II through the WeChat communication channel. On the other hand, because Client Profile B and C both have a connection to the WeChat communication channel, any user of either of those client profiles may communicate with Client Individual II through the WeChat communication channel.

Bankers Y and Z may communicate with Client Individual II through the WeChat communication channel in a similar way as how banker X communicated with Client Individual I through the WhatsApp communication channel. Banker Y may communicate directly through the central messaging platform, where any message they send through the platform may be delivered directly to the WeChat account associated with the WeChat ID identifier. The central messaging platform may directly deliver the message to the WeChat account, after which Client Individual II may send a reply using the WeChat account, and the central messaging platform may receive it directly from WeChat and display the reply.

Figure 4:
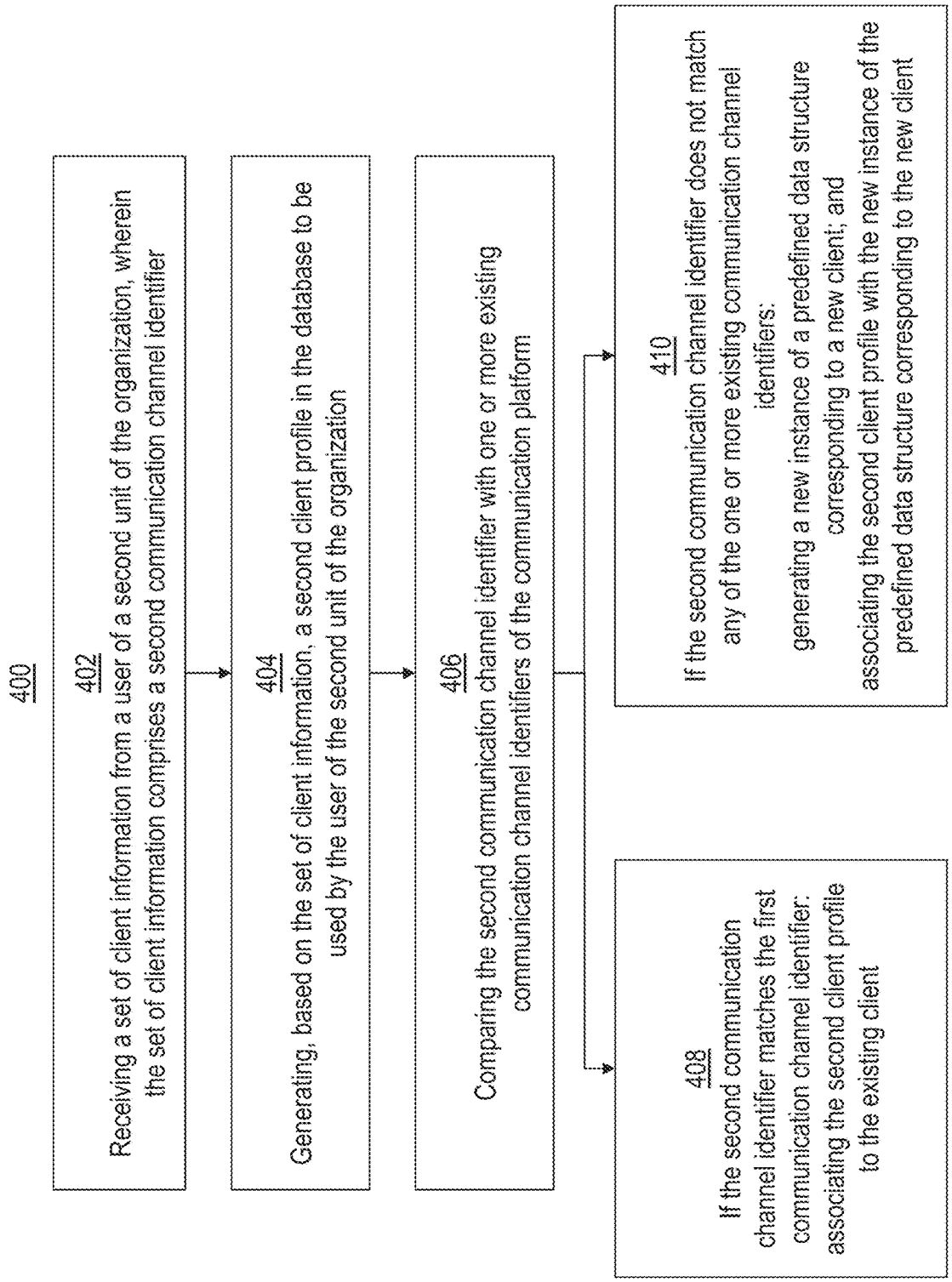
FIG. 4 depicts an exemplary process for managing client profiles in a central messaging platform providing communication between an organization and a plurality of clients using separate messaging applications, in accordance with some embodiments.

FIG. 4 illustrates process 400 for managing client profiles in a central messaging platform providing communication between an organization and a plurality of clients using separate messaging applications, according to various examples. Process 400 is performed, for example, using one or more electronic devices implementing a software platform. In some examples, process 400 is performed using a client-server system, and the blocks of process 400 are divided up in any manner between the server and a client device. In other examples, the blocks of process 400 are divided up between the server and multiple client devices. Thus, while portions of process 400 are described herein as being performed by particular devices of a client-server system, it will be appreciated that process 400 is not so limited. In other examples, process 400 is performed using only a client device (e.g., user device 100) or only multiple client devices. In process 400, some blocks are, optionally, combined, the order of some blocks is, optionally, changed, and some blocks are, optionally, omitted. In some examples, additional steps may be performed in combination with the process 400. Accordingly, the operations as illustrated (and described in greater detail below) are exemplary by nature and, as such, should not be viewed as limiting.

Before block 402 is performed, the central messaging platform already comprises a database storing one or more existing communication channel identifiers. The one or more existing communication channel identifiers comprise a first communication channel identifier associated with a first client profile associated with an existing client. The first client profile is used by a first unit of the organization to communicate with the existing client using the first communication channel identifier.

For example, the central messaging platform may comprise a database of client profiles for storing all of the client profiles. Client profiles may be Client Profile A, Client Profile B, and Client Profile C in FIG. 3. As discussed above, these client profiles are associated with a specific business unit of an organization, and comprise information on a client of the specific business unit that the business unit is allowed to know. For example, in FIG. 3, Client Profile A is associated with business unit (BU) 1. Behind the scenes, each client profile may be associated with a client entities. For example, Client Profiles A, B, C can all be associated with a client entity corresponding to Client Individual I in FIG. 3.

The information that a client profile comprises may include one or more communication channel identifiers that the business unit the profile is associated with may use to communicate with a client individual. Referring back to FIG. 3, Client Profile A may comprise information on the WhatsApp communication channel and the corresponding phone number identifier. BU 1 being associated with Client Profile A indicates the BU may communicate with Client Individual I using the WhatsApp communication channel. The database of client profiles may store such client profiles and all of their corresponding information.

This database of client profiles may be integrated with the database of users 102 or may be a separate database instance. In either case, the client profiles and communication channel identifiers may be associated through being part of a record in the database. Each record may be an instance of a client profile which comprises all the client information that is known by that client profile. For example, the schema as introduced in Table 2 may be expanded to include more attributes to hold the other information that a client profile might comprise as discussed above, such as name, client/company name, communication channel identifier, language, and so on. It may be noted that any schema may be used in lieu of that described herein. Having communication channel identifiers in both the database of client profiles and in the binding databases may be redundant, but it may be noted various embodiments may include optimizations to address the redundancy.

It may be noted that depending on what kind of database is used, the notion of a "record" within the database may change. In relational database management systems (RDBMS), the use of tables and schemas like in Table 2 may mean a "record" is a single line in the database. Generating a new record in RDBMS may thus mean creating a new line in the table(s) and populating the table attributes with the different information components associated with that specific entry, which in this case may be the information in a client profile. However, if the database used is a NoSQL database such as MongoDB, each "record" may be more of a data structure. In the specific example of MongoDB, each "record" in the database is stored as a BSON (Binary Javascript Object Notation) document, which is a binary representation of a JSON (JavaScript Object Notation) document. Generating a new record in such a database may thus mean creating a new data structure representing the client profile, with the fields of the data structure holding the information that comprises a client profile.

As each client profile is associated with a client of the bank, the association may be stored in the database of client profiles. The association may be stored by having each client profile record in the database of client profiles store which client they are a profile for. Alternatively, or additionally, the system may have a database of clients or some other kind of storage unit with a list of all the clients. Each client profile in the database of client profiles may have an association to one of the clients in this database of clients to solidify the association between client profile and client. Each time a new client profile is created by a business unit, the database of clients may be queried to determine if the client already exists for the bank. If it does exist, an association may be made. If the new client profile specified a brand new client, a new record may be added to the database of clients, before the client profile may be associated with the new record in the database of clients. The association between the client profile and the client may be achieved in any number of ways. An example method may be to create a primary key-foreign key dependency between the client in the database of clients and the client profile in the database of client profiles, although it may be noted there are many other possible methods.

When a banker uses the central messaging platform to communicate with a client, the client profile may be retrieved from the database of client profiles. The communication channel that should be used to send a message is identified, which may be used to determine which communication link 90*a*, 90*b*, 90*c* to use to route the message. The corresponding integration module 61, 71, 81 then finds the communication channel identifier from its corresponding binding database 66, 76, 86 to determine which specific account on the communication channel the message is intended for, before sending the message across the corresponding link 63, 73, 83 to that specific account. When each message between a banker and a client is sent and received, the message may be stored in the message server 120, where the message is stored with data to indicate the client profile that this message is associated with. For example, a message that is sent or received by a banker in BU 2 may be stored in the message server with data to indicate the message is associated with Client Profile B.

Figure 5A:
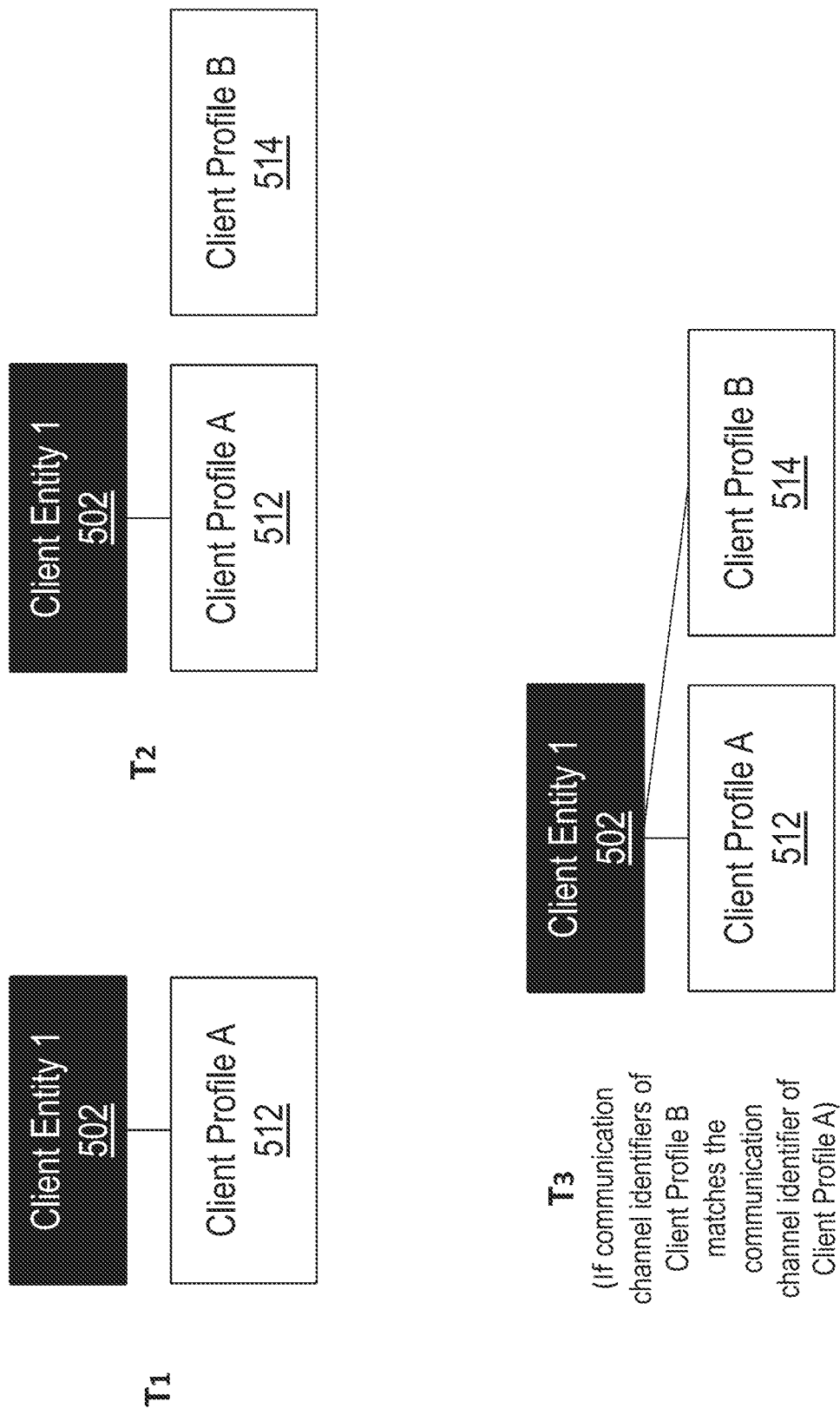
FIG. 5A depicts a conceptual schematic for the process of associating new client profiles with existing client entities, in accordance with some embodiments.
Figure 5B:
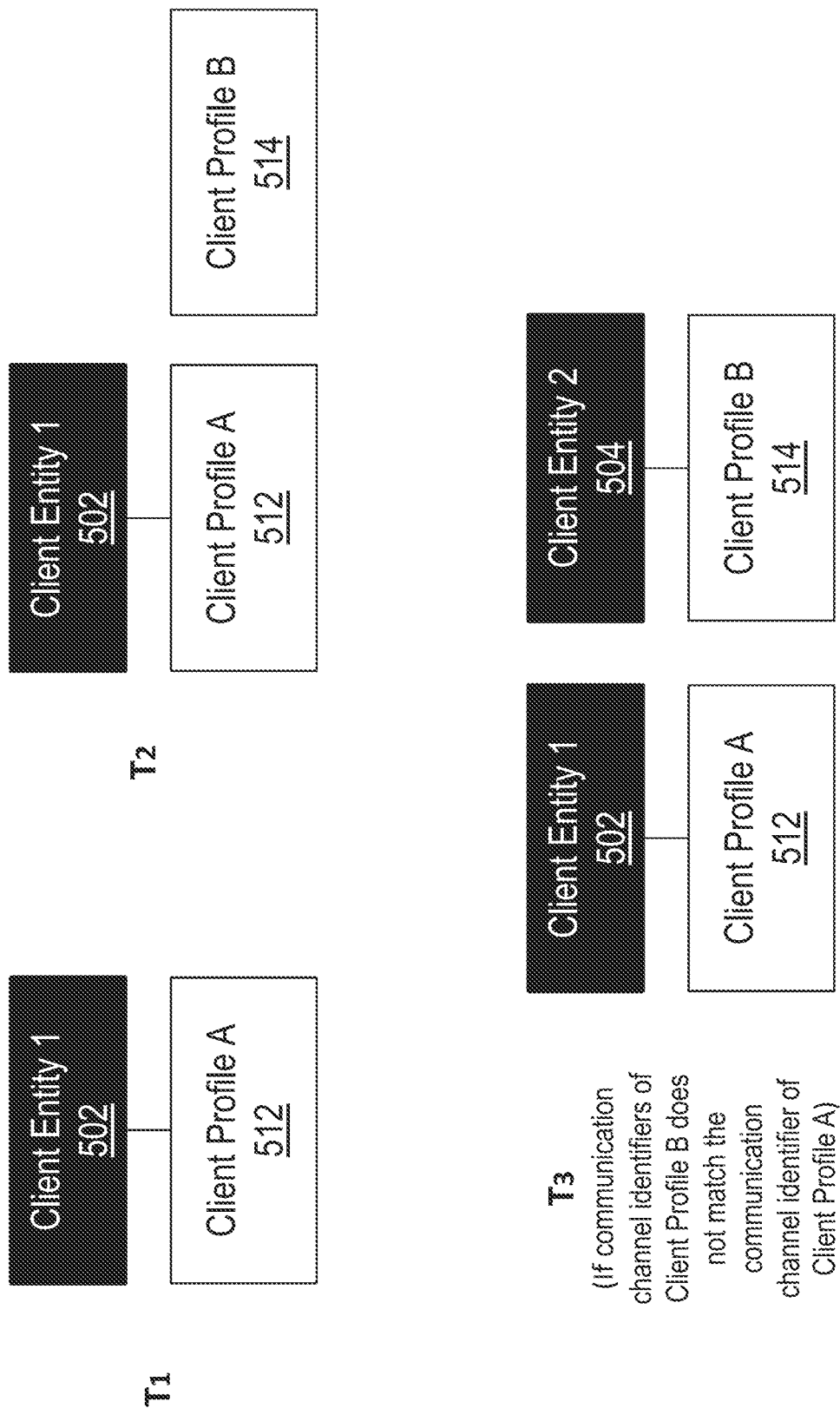
FIG. 5B depicts a conceptual schematic for the process of associating new client profiles with new client entities, in accordance with some embodiments.

FIGS. 5A and 5B illustrate a conceptual schematic for what may be stored using a database of client profiles and client entities, in accordance with some embodiments. At T1, there exists an existing Client Profile A which is associated with an existing client entity, Client Entity 1. This schematic illustrates the profile, entity, and association between the two that may be stored using a database, where the exact storage implementation may be flexible. As discussed above, a first implementation may be to have a database of client profiles store all of the client profile, client entity, and association between the profile and entity. In such an implementation, the database of client profiles may comprise records with attributes for all of the information associated with the client profile, including the client entity that the client profile is associated with. Then, by virtue of being in the same record in the database, the client profile and client entity are associated with each other as depicted in the schematic at T1.

The second implementation described above may also implement the schematic depicted at T1. In such an implementation, separate database instances may exist, a database of client profiles to store the client profiles like Client Profile A, and a database of clients to store client entities like Client Entity 1. A record in the database of profiles may represent a client profile, and all of the information comprised within the profile. A record in the database of clients may represent a client entity. The association between a client profile and a client entity may then be stored through a relation between the two database instances. It may be noted that various other implementations of the schematic at T1 are possible.

Turning back to FIG. 4, at block 402, the central messaging platform receives a set of client information from a user of a second unit of the organization, which may be a banker from a bank. The set of client information comprises a second communication channel identifier. As discussed above, before block 402 is performed, the central messaging platform already comprises a database storing one or more existing communication channel identifiers. The one or more existing communication channel identifiers comprise a first communication channel identifier associated with a first client profile associated with an existing client. The first client profile is used by a first unit of the organization to communicate with the existing client using the first communication channel identifier.

The platform may receive the client information through any means at block 402. The user may manually input the client information into the platform using a predefined interface (e.g., FIG. 6), where the platform then reads directly from the interface to obtain the client information. Alternatively, the platform may support an application programming interface (API) to accept client information that is sent from another software application. In this case, an application may send the client information directly to the platform. The application may indicate that the transfer of information only executed after confirmation from the user, so that this process may effectively be considered receiving the client information from the user.

At block 404, the central messaging platform generates, based on the set of client information, a second client profile in the database of client profiles to be used by the user of the second unit of the organization. First, it may be noted that while the new client profile may be used by the user that generated the profile, it may also be used by other users, as long as the other users have the correct permissions or designations, such as belonging to the same business unit as the user who provided the information for the profile. As discussed above, when a new client profile is generated, the system may generate a new instance of a predefined data structure to represent the client profile and store any related and necessary information, where the data structure may depend on the specific type of storage employed. The client information that was just received from the user may be stored into the client profile. The client profile may provide read access to the client information that is stored inside of it, so that any user who wishes to is able to access the information about the client through the client profile. The client profile may further store the communication channel identifier for the preferred communication channel of the client. This channel identifier stored in the client profile may serve a variety of different purposes. For example, it may serve to associate the client profile with the channel identifier that is stored in the binding databases, which may be used to confirm a message is being delivered to the correct account on a given communication channel. Or it may simply exist in the client profile as information that may be referred to by a user or the system. The state of the system once the client profile has been generated is shown at T2 of FIGS. 5A and 5B.

T2 of FIGS. 5A and 5B illustrate a conceptual schematic on the state of the system immediately following the generation of the new client profile. Client Profile A, Client Entity 1, and the association between them already existed in the database(s) and persist through the generation of the new client profile, Client Profile B. At T2, the new Client Profile B has just been generated using a new set of client information, which is comprised within the profile. At this time, no processing has occurred to determine whether the new Client Profile B has any relation to any existing client entities, and thus no association is made between the new Client Profile B and a client entity.

After the client profile has been generated, the system may send a request or invitation to the client to begin communicating on the communication channel specified in the information used to create the new client profile. Once the client has accepted the request to communicate through the indicated communication channel and the communication channel identifier, the relevant link 63, 73, or 83 may be updated to complete the connection between the central messaging platform and the communication channel identifier of the indicated communication channel the client and users of the new client profile may communicate directly with one another, the clients using their preferred communication channel and the users through the messaging platform. As mentioned earlier, the central messaging platform may send/receive messages directly to/from the client's account on their communication channel.

At block 406, the communication channel identifier of the second client profile that was just generated is compared with one or more existing communication channel identifiers in the central messaging platform. This step may prevent the platform from needing to store unnecessary copies of the same communication channel identifiers, as the communication channel identifier may have already been stored into the system by another business unit. This comparison may also help to identify if an existing communication link 90*a*, 90*b*, 90*c* will be used, which may prevent creating redundant communication links. Further, associating multiple client profiles with a single client entity allows the system to easily identify, manage, and retrieve communications between the client entity and the entire organization (e.g., for auditing purposes), even if the communications belong to different business units that are walled off from each other within the organization.

The comparison may be performed in a number of ways. For example, the database of client profiles may be queried just for client profiles that comprise the second communication channel identifier. Any results returned by the query may indicate that the second communication channel identifier already exists in the system; on the other hand, no results may indicate that the second communication channel identifier does not yet exist in the system. Another way to perform the comparison may be to query the binding database associated with the communication channel that the communication channel identifier is for. In other words, and referring back to FIG. 1, if the communication channel of the second communication channel identifier is messaging network 1, then binding database 66 may have a record of the second communication channel identifier. Once again, a query on this database that returns any results may indicate the second communication channel identifier is already known to the system and no results indicate otherwise.

At block 408, if the communication channel identifier of the second client profile matches a first existing communication channel identifier, the second client profile is associated with the existing client. In such cases when the communication channel identifier matches that of an existing identifier, it may be concluded that the client of the new client profile has already been on-boarded by another business unit. The stored list of clients, such as the database of clients, may be queried using any client identifier, such as the client's name or a special client id, where the result of the query may be associated with the second client profile. It may be noted that no additional processing is necessary to allow users of the second client profile in such cases to communicate with the client through the communication channel identifier. This is because an existing communication channel identifier means it has already been stored in one of the existing binding databases associated with a communication channel, so the second client profile just needs to identify which communication link is associated with its communication channel identifier, and the channel identifier may then be retrieved from the corresponding binding database.

T3 of FIG. 5A illustrates a conceptual schematic of the overall system following the completion of block 408. Similar to before, Client Profile A, Client Entity 1, and the association between the two already existed in the database(s), and have persisted from T1 to T3. The comparison that was performed at block 406 determined that the communication channel identifier of the new client profile, Client Profile B, matched an existing communication channel identifier, where that existing identifier was associated with the existing Client Entity 1. For reference, and referring back to FIG. 3, a communication channel identifier, such as the phone number identifier, is associated with a client entity, such as Client Individual I. By identifying an existing communication channel identifier, a corresponding existing client entity may also be determined. After determining the new Client Profile B is a profile of the existing Client Entity 1, the new Client Profile B may be associated with Client Entity 1 in the same manner as Client Profile A.

At block 410, the central messaging platform has determined that the second communication channel identifier does not match any existing communication channel identifiers. As a result, it may be concluded that the new second client profile is not a new profile for an existing client entity. This is because, referring back to the example of FIG. 3, each communication channel identifier, such as the phone number identifier, is associated with a client entity, such as Client Individual I. Since the communication channel identifier of the new second client profile does not already exist, there would not be an existing client entity for such a non-existing communication channel identifier. After this has been determined, a new instance of a predefined data structure corresponding to a new client entity is generated. Again, it may be noted that "data structure" may change depending on the specific type of storage or database used to track client entities. The new second client profile is then associated to this newly generated instance corresponding to the new client entity.

It may be noted that some additional processing may be necessary in this case to allow users of the second client profile to communicate with the client through the communication channel identifier of the new client profile. Because the new communication channel identifier did not match any existing identifiers, the new identifier does not exist in any of the binding databases 66, 76, 86. The integration module 60, 70, 80 of the platform may need to be able to find the communication channel identifier in its associated binding database in order to send messages to the appropriate accounts of the communication channel or messaging network across the links 63, 73, 83. Thus, in addition to generating the new client entity and associating the new client profile to the new client entity, the new communication channel also needs to be added into the appropriate binding database.

T3 of FIG. 5B illustrates a conceptual schematic of the overall system following the completion of block 410. Similar to before, Client Profile A, Client Entity 1, and the association between the two already existed in the database(s), and have persisted from T1 to T3. The comparison that was performed at block 406 determined that the communication channel identifier of the new client profile, Client Profile B, does not match any existing channel identifier. As a result, a new Client Entity 2 is generated, and the new Client Profile B is associated with the new client entity. It may be noted that the new Client Profile B, the new Client Entity 2, and the association between them is similar to that of Client Profile A, Client Entity 1, and the association between them. As such, the new Client Profile B and Client Entity 2 may be stored in the same manner as Client Profile A and Client Entity 1.

It may be noted that process 400 also enables, in some embodiments, a single client profile to be associated with multiple client entities. Consider the following scenario, with reference to the depicted example in FIG. 3. In this scenario, it may be assumed that Client Profile A has already been created and is already associated with the client entity Client Individual I. Consequently, the phone number identifier already exists in the system of the central messaging platform. BU 2 may then seek to on-board a client and is provided with two communication channel identifiers in the process as part of block 402, the phone number identifier and the WeChat ID identifier. Client Profile B may then be generated based on the information received by BU 2, as part of block 404. The system of the central messaging platform may then first compare the phone number identifier with the existing channel identifiers in the system, in accordance with block 406. As the phone number identifier already exists, the phone number identifier provided to BU 2 may be matched with the existing phone number identifier, and thus, in accordance with block 408, the new Client Profile B is associated with an existing client entity associated with the existing communication channel identifier, Client Individual I. Additionally in such a scenario, as part of block 406, the WeChat ID identifier may also be compared against the existing channel identifiers in the system. However, at this point, the WeChat ID identifier does not exist in the system. As a result, the process 400 in this case proceeds to block 410, where a new client entity, Client Individual II, is generated, with an association to the WeChat ID identifier. The new Client Profile B may then be associated to this new Client Individual II, in addition to being associated with Client Individual I, as the client profile is associated with the channel identifiers of both client entities.

In this same scenario, after Client Profile B has been completely generated, BU 3 may then seek to on-board a client and, like BU 2, may be provided with both the phone number identifier and WeChat ID identifier. Client Profile C may then be generated based on the information provided to BU 3. As the system of the central messaging platform then proceeds to block 406, both the phone number and WeChat ID identifiers may once again be compared against existing channel identifiers in the system. However, this time both of the identifiers may be matched to existing identifiers as both the phone number and WeChat ID identifiers already exist in the system following the creation of Client Profile A and B. The process 400 thus proceeds to block 410, and the new Client Profile C is associated with both client entities Client Individual I and Client Individual II, as the new client profile is also associated with the channel identifiers of both client entities.

As a related consideration, because a client profile may be associated with multiple client individuals, and each client individual may be associated with multiple client profiles, it may become challenging to identify the relevant client profile that should be used for a specific communication. For example, even if communication may be intended to be done through the WhatsApp channel and the associated phone number identifier, it may not be clear from that alone which of client profiles A, B, or C should be used. In such situations, identifying the exact client profile needed may require a combination of the communication channel identifier/client individual and a banker/business unit. Further, when retrieving communications between a client individual and the organization (e.g., for auditing purposes), the system may also rely on the communication channel identifier. For example, to retrieve communications between Client Individual II and the organization, the system can first retrieve communications associated with Client Profile B and Client Profile C. However, because Client Profile B is associated with both Client Individual I and Client Individual II, the WeChat ID identifier is needed to identify a subset of the communications associated with Client Profile B. Further, because Client Profile C is associated with both Client Individual I and Client Individual II, the WeChat ID identifier is needed to identify a subset of the communications associated with Client Profile C.

Figure 6:
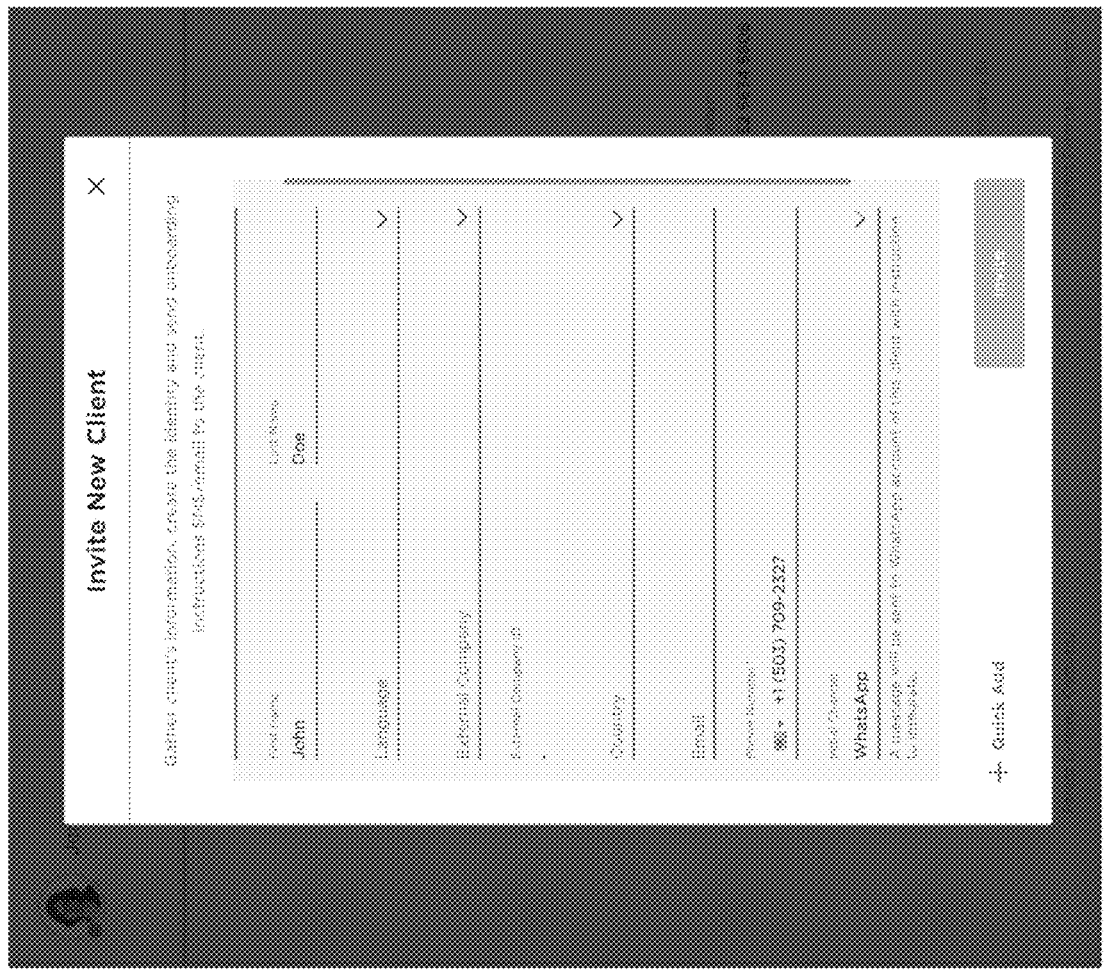
FIG. 6 depicts an exemplary user interface for inputting client information when inviting a new client to communicate with an organization through a central messaging platform, in accordance with some embodiments.

FIG. 6 depicts an exemplary user interface for entering client information when a business unit is inviting a client to communicate with them. The interface may provide some areas to specify various identifying information of the client, such as a name to refer to in communications, the language that the client prefers to communicate in, the name of the external company, a company ID, and a country, which may be the country where the client is headquartered or the country where this specific unit of a larger organization is located. The external company ID may be provided by the user or may be automatically generated by the system. The interface may also have space to enter an email. Finally, the interface may have spaces to enter a communication channel identifier and a communication channel, which may be the primary way to communicate with the client. In the example in the figure, the channel is WhatsApp, and the specific WhatsApp account is identified by the phone number. Once all of the information has been entered, the system may send an invitation to the client to begin communicating with the business unit through the specified channel and channel identifier, which in this case may be the WhatsApp account associated with the phone number (503) 709-2327.

Figure 7A:
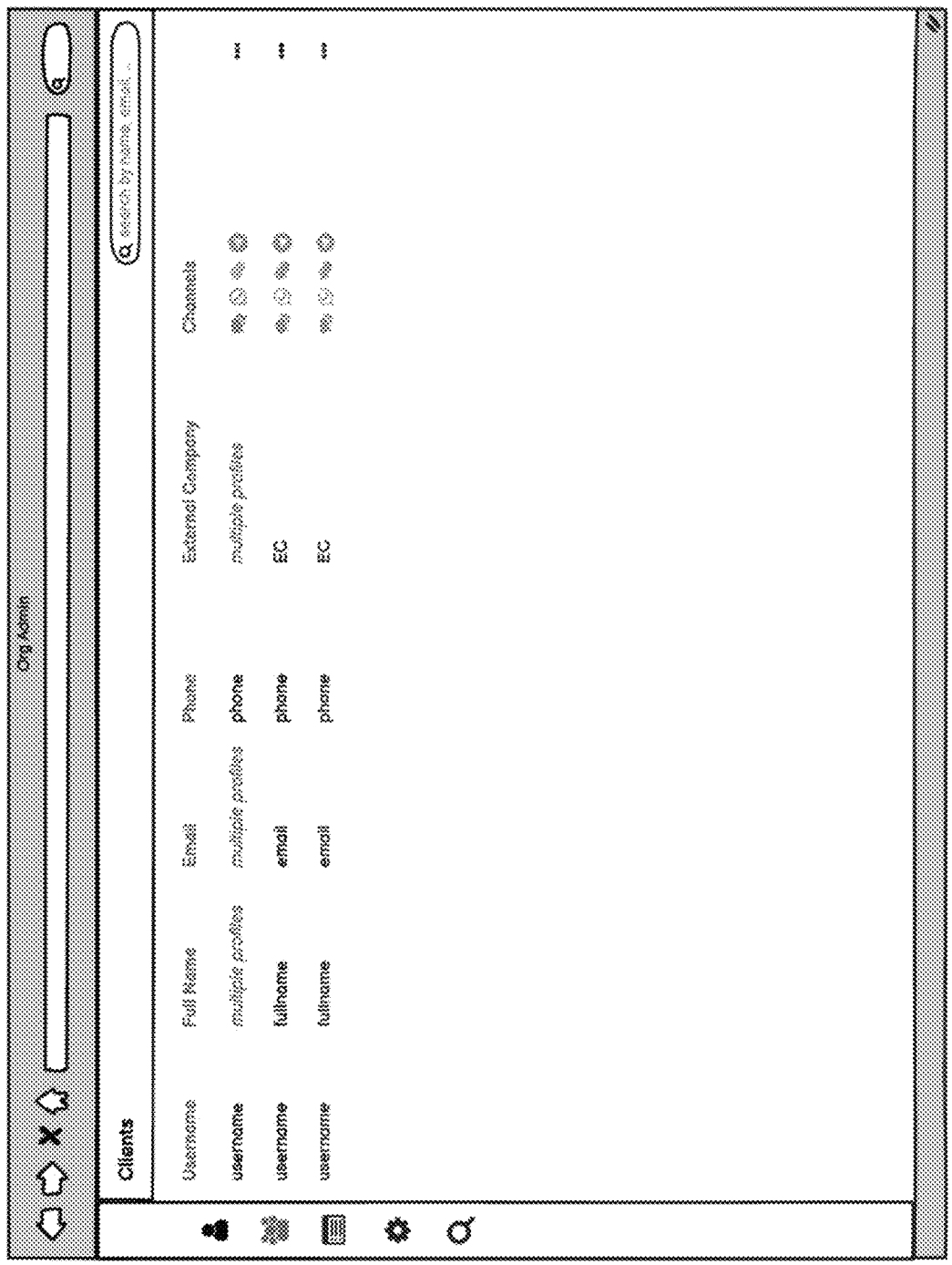
FIG. 7A depicts an exemplary user interface for viewing a list of clients communicating with the organization through the central messaging platform, in accordance with some embodiments.

FIG. 7A depicts an exemplary user interface for viewing a list of all the clients communicating with the organization through the central messaging platform. The interface may display a username to represent each client. The username may be the external company ID that was generated or provided by the interface of FIG. 6. Alternatively, the username may be any other identifier that the system may use to uniquely identify clients. The interface may display a full name for each client. This full name may be a specific individual in the client organization that a business unit is communicating with. Displaying a single name here may indicate that only a single client profile exists for this client. It may also mean that there are multiple client profiles for the client, but because all of the client profiles comprise the same name, it is displayed as so. If there are multiple client profiles for a client and they do not share a common name, the interface may display that fact by indicating there are multiple profiles for the client, as shown for the first client. It may be noted that, for the first username/client, the interface indicates the presence of multiple profiles under the External Company column. This may be the case if the system is configured to recognize different affiliate companies under a same parent company. The interface displayed in the figure may be used either by members of a business unit or by an administrator, and depending on what party is using it, the interface may support different functionality. If a member of a business unit is using the interface to view all of the clients currently communicating with the business unit, the interface may not display the fact that there are multiple profiles under any column, as that would provide information between business units and thus violate the "wall" that exists between business units. On the other hand, if an administrator is using the interface to view all of the clients currently communicating with the entire organization, the interface may display the fact that there are multiple profiles as that would not involve sharing information between business units.

Figure 7B:
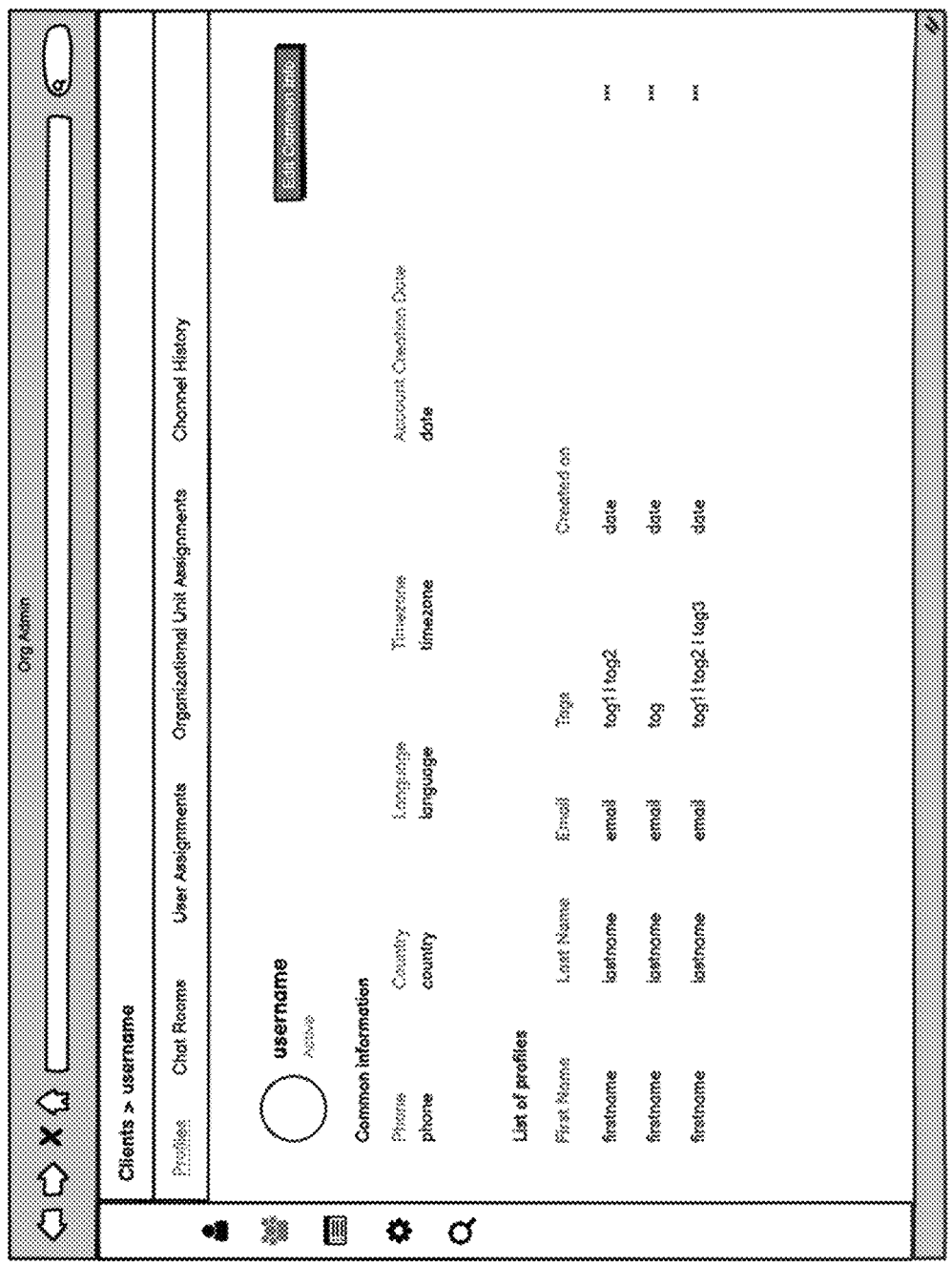
FIG. 7B depicts an exemplary user interface for viewing the details on a specific client and a list of all the existing client profiles associated with the specific client, in accordance with some embodiments.

FIG. 7B depicts an exemplary user interface for viewing the details on a specific client and a list of all the client profiles associated with the specific client. As the client profiles are all profiling the same client, there may be common information between all of the client profiles, which the interface may display in a dedicated common information section. In another section, the interface may display all of the client profiles for the given client, which may include only the profiles that are currently being used by a business unit, or may also include all client profiles that were ever created for the client, including those that are no longer being used by any business units. For each of the client profiles, the interface may display the information that is in each client profile, and thus what each client profile knows about the given client. Upon selecting any of the profiles for the specific client, the user interface may display all of the communication history that is associated with the selected client profile. This information may be readily retrieved from the message server 120, which may be configured to store all communication along with data to associate the communication to a client profile as discussed earlier. In some embodiments, the system allows the user to review the communications and further filter the communications (e.g., by communication channel identifiers).

Figure 7C:
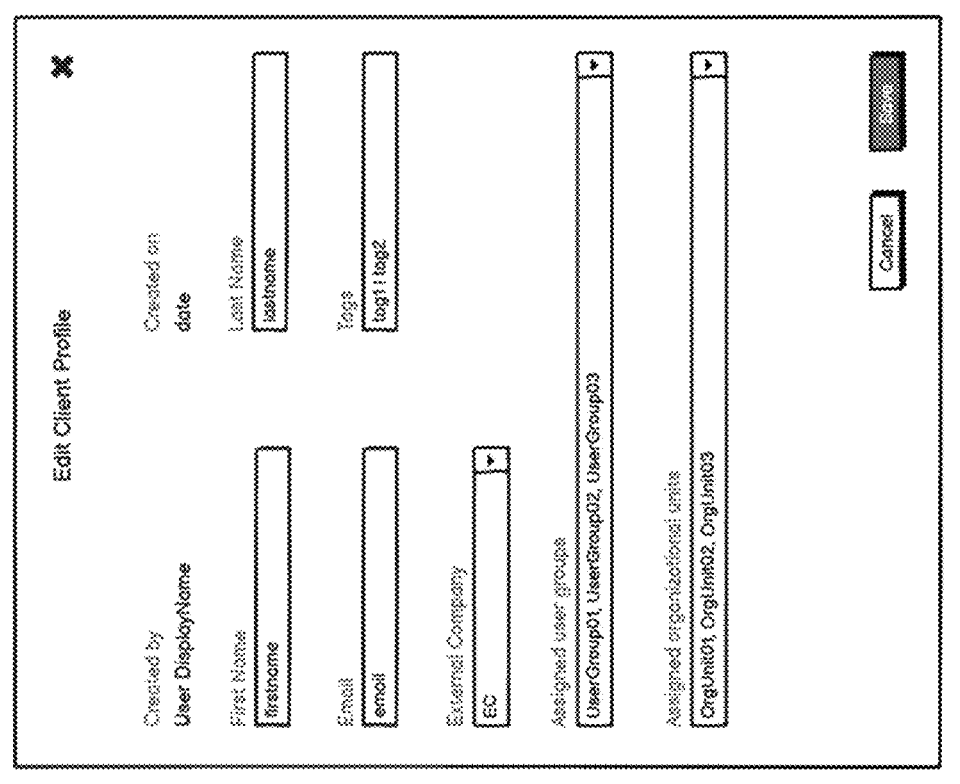

FIG. 7C depicts an exemplary user interface for updating the information of a client profile. The interface may allow new information to be added to the profile, and allow any existing information to be updated or removed. As part of this, the interface may allow communication channel identifiers to be altered as well. This may mean that new communication channels may be added to the client profile, and existing identifiers updated and/or removed without needing to create/remove the client profile itself. It may be noted that if communication channel identifier information is updated using the interface, it may require the system to make other appropriate changes to reflect the new information. With new communication channel identifier information, the system may need to perform block 406, 408, and 410 again to ensure the central messaging platform is able to communicate with the newly identified communication channel.

Using embodiments of the present disclosure, different business units within the same organization may each onboard their own clients without unnecessarily convoluting the system. For a single client, the central messaging platform may support separate client profiles for the different business units but associate the client profiles with a single client entity, instead of having multiple client entities. As a result, the central messaging platform may make it more easy and efficient to retrieve a holistic view of all communications between the organization and a client entity. Because the system only maintains a single client entity which may be associated with multiple profiles, all of the communication associated with a particular client entity may be easily retrieved based on the client profiles associated with the particular client entity. For example, with reference to FIG. 3, if an auditor or administrator wishes to review all of the communications associated with the client entity Client Individual I, that may be retrieved efficiently by first identifying all of the associated client profiles A, B, and C and then retrieving communications based on the identified client profiles.

The system may also help clearly indicate to a requestor (e.g., an auditor) the organization's involvement with a client (e.g., which business units are working with the client) and provide user interfaces for retrieving and viewing all of the communications associated with the client across different business units. Without leveraging the techniques described herein, there may be multiple, unrelated client entities created for the same client. When all of the communications between the organization and that client entity are requested, it would be difficult for the system to compile the communications. An auditor may have to manually survey the various business units separately in the organization to obtain a holistic view of the organization's involvement with the client. This may a lengthy and cumbersome process that increases the chance of error, resulting in some communications not being retrieved. Thus, embodiments of the present disclosure provide improved user interfaces, improves data management and retrieval for the communication platform, and reduces unnecessary usage of memory and processing power of the computer system.

FIG. 8 illustrates an example of a computing device in accordance with one embodiment. Device 800 can be a host computer connected to a network. Device 800 can be a client computer or a server. As shown in FIG. 8, device 800 can be any suitable type of microprocessor-based device, such as a personal computer, workstation, server or handheld computing device (portable electronic device) such as a phone or tablet. The device can include, for example, one or more of processor 810, input device 820, output device 830, storage 840, and communication device 860. Input device 820 and output device 830 can generally correspond to those described above, and can either be connectable or integrated with the computer.

Input device 820 can be any suitable device that provides input, such as a touch screen, keyboard or keypad, mouse, or voice-recognition device. Output device 830 can be any suitable device that provides output, such as a touch screen, haptics device, or speaker.

Storage 840 can be any suitable device that provides storage, such as an electrical, magnetic or optical memory including a RAM, cache, hard drive, or removable storage disk. Communication device 860 can include any suitable device capable of transmitting and receiving signals over a network, such as a network interface chip or device. The components of the computer can be connected in any suitable manner, such as via a physical bus or wirelessly.

Software 850, which can be stored in storage 840 and executed by processor 810, can include, for example, the programming that embodies the functionality of the present disclosure (e.g., as embodied in the devices as described above).

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A method for managing client profiles in a central communication platform providing communication between an organization and a plurality of clients using separate messaging applications,
    wherein the central communication platform comprises a database storing one or more existing communication channel identifiers,
    wherein the one or more existing communication channel identifiers comprise a first communication channel identifier associated with a first client profile associated with an existing client, and
    wherein the first client profile is used by a first unit of the organization to communicate with the existing client using the first communication channel identifier;
    the method comprising:
        receiving a set of client information from a user of a second unit of the organization, wherein the set of client information comprises a second communication channel identifier and wherein the first unit and the second unit are separated in accordance with an ethical wall;
        generating, based on the set of client information, a second client profile in the database to be used by the user of the second unit of the organization;
        comparing the second communication channel identifier with one or more existing communication channel identifiers of the communication platform;
        if the second communication channel identifier matches the first communication channel identifier: associating the second client profile to the existing client;
        if the second communication channel identifier does not match any of the one or more existing communication channel identifiers:
            generating a new instance of a predefined data structure corresponding to a new client; and
            associating the second client profile with the new instance of the predefined data structure corresponding to the new client.

2. The method of claim 1, further comprising: associating one or more communications in the communication platform between the user of the second business unit and the second communication channel identifier with the second client profile.

3. The method of claim 1, further comprising: associating one or more communications in the communication platform between a user of the first business unit and the first communication channel identifier with the first client profile.

4. The method of claim 1, further comprising:
    displaying a first user interface indicating that the existing client is associated with the first client profile and the second client profile.

5. The method of claim 4, further comprising:
    displaying a second user interface with additional information associated with the existing client.

6. The method of claim 5, further comprising:
    displaying a third user interface for updating the additional information associated with the existing client.

7. The method of claim 6, further comprising:
    displaying a fourth user interface comprising one or more communications associated with the first client profile and one or more communications associated with the second client profile.

8. The method of claim 1, wherein the one or more existing communication channel identifiers comprises an identifier indicative of a third-party communication platform and a user name.

9. The method of claim 1, wherein the one or more existing communication channel identifiers comprises an identifier indicative of a third-party communication platform and a phone number.

10. The method of claim 1, further comprising:
    receiving, from the user, a second set of client information comprising a third communication channel identifier and a fourth communication channel identifier;
    generating a third client profile based on the second set of client information;
    comparing the third and fourth communication channel identifiers with the one or more existing communication channel identifiers; and
    if the third communication channel identifier matches the first communication identifier, associating the third client profile with the existing client.

11. The method of claim 10, further comprising:
    if the fourth communication channel identifier does not match any of the one or more existing communication channel identifiers:
        generating a second new instance of a predefined data structure corresponding to a second new client, and associating the third client profile with the second new client.

12. The method of claim 10, further comprising:
    associating one or more communications in the communication platform between the third communication channel identifier and the user with the third client profile and the third communication channel identifier.

13. The method of claim 10, further comprising:
associating one or more communications in the communication platform between the fourth communication channel identifier and the user with the third client profile and the fourth communication channel identifier.

14. The method of claim 1, wherein the new instance of the predefined data structure comprises a first name, a last name, a language, a company name, a country, an email, the first communication channel identifier, or any combination thereof.

15. The method of claim 1, further comprising:
sending an invitation request to begin messaging with the user of the second unit.

16. The method of claim 15, further comprising:
upon acceptance of the invitation, establishing a connection between the central communication platform and the third-party communication platform associated with the second communication channel identifier.

17. The method of claim 1, further comprising:
receiving, from an auditor, a request to audit communications between a given client and the organization;
identifying a client entity associated with the given client;
identifying one or more client profiles associated with the client entity;
retrieving, based on the request, a set of communications from the one or more client profiles; and
providing the auditor with the set of communications.

18. The method of claim 17, further comprising:
identifying one or more communication channel identifiers associated with the client entity;
retrieving, based on the one or more communication channel identifiers, a subset of the set of communications from the one or more client profiles, wherein the subset of the set of communications is associated with the given client; and
providing the auditor with the subset of the set of communications.

19. An electronic device for managing client profiles in a central communication platform providing communication between an organization and a plurality of clients using separate messaging applications,
wherein the central communication platform comprises a database storing one or more existing communication channel identifiers,
wherein the one or more existing communication channel identifiers comprise a first communication channel identifier associated with a first client profile associated with an existing client, and
wherein the first client profile is used by a first unit of the organization to communicate with the existing client using the first communication channel identifier;
the electronic device comprising:
one or more processors;
a memory; and
one or more programs, wherein the one or more programs are stored in the memory and configured to be executed by the one or more processors, the one or more programs including instructions for:
receiving a set of client information from a user of a second unit of the organization, wherein the set of client information comprises a second communication channel identifier and wherein the first unit and the second unit are separated in accordance with an ethical wall;
generating, based on the set of client information, a second client profile in the database to be used by the user of the second unit of the organization;
comparing the second communication channel identifier with one or more existing communication channel identifiers of the communication platform;
if the second communication channel identifier matches the first communication channel identifier:
associating the second client profile to the existing client;
if the second communication channel identifier does not match any of the one or more existing communication channel identifiers:
generating a new instance of a predefined data structure corresponding to a new client; and
associating the second client profile with the new instance of the predefined data structure corresponding to the new client.

20. A non-transitory computer-readable storage medium storing one or more programs for managing client profiles in a central communication platform providing communication between an organization and a plurality of clients using separate messaging applications,
wherein the central communication platform comprises a database storing one or more existing communication channel identifiers,
wherein the one or more existing communication channel identifiers comprise a first communication channel identifier associated with a first client profile associated with an existing client,
wherein the first client profile is used by a first unit of the organization to communicate with the existing client using the first communication channel identifier, and
wherein the one or more programs comprising instructions, which when executed by one or more processors of an electronic device having a display, cause the electronic device to:
receive a set of client information from a user of a second unit of the organization, wherein the set of client information comprises a second communication channel identifier and wherein the first unit and the second unit are separated in accordance with an ethical wall;
generate, based on the set of client information, a second client profile in the database to be used by the user of the second unit of the organization;
compare the second communication channel identifier with one or more existing communication channel identifiers of the communication platform;
if the second communication channel identifier matches the first communication channel identifier:
associate the second client profile to the existing client;
if the second communication channel identifier does not match any of the one or more existing communication channel identifiers:
generate a new instance of a predefined data structure corresponding to a new client; and
associate the second client profile with the new instance of the predefined data structure corresponding to the new client.

* * * * *